(No Model.) 2 Sheets—Sheet 1.

W. W. S. ORBETON.
SASH BALANCE.

No. 441,019. Patented Nov. 18, 1890.

Witnesses
C. F. Daniels
Francis Hall

Inventor
William W. S. Orbeton
by S. N. Piper, atty.

(No Model.) 2 Sheets—Sheet 2.

W. W. S. ORBETON.
SASH BALANCE.

No. 441,019. Patented Nov. 18, 1890.

*Fig. 8.* *Fig. 9.*

Witnesses
C. F. Daniels
Francis Hall

Inventor
William W. S. Orbeton
by S. N. Piper, atty.

UNITED STATES PATENT OFFICE.

WILLIAM W. S. ORBETON, OF SAUGUS, ASSIGNOR TO LOUISA ADELAIDE ORBETON, OF CHELSEA, MASSACHUSETTS.

SASH-BALANCE.

SPECIFICATION forming part of Letters Patent No. 441,019, dated November 18, 1890.

Application filed September 6, 1889. Serial No. 323,148. (No model.)

*To all whom it may concern:*

Be it known that I, WILLIAM W. S. ORBETON, a citizen of the United States, residing at Saugus, in the county of Essex and State of Massachusetts, have invented certain new and useful Improvements in Sash-Balances; and I do declare the following to be a full, clear, and exact description of the invention, such as will enable others skilled in the art to which it appertains to make and use the same, reference being had to the accompanying drawings, and to the letters of reference marked thereon, which form a part of this specification.
On the 1st day of October, 1872, Letters Patent of the United States of America No. 131,773 were granted to myself as inventor and to Frank G. Phillips as assignee of one-half interest for an improvement in sash-balances.

The object of my present improvement is to do away with the removal of the sashes from the casing to either connect them or to adjust them, or to lengthen or shorten the attachment connecting them.

Figure 1:
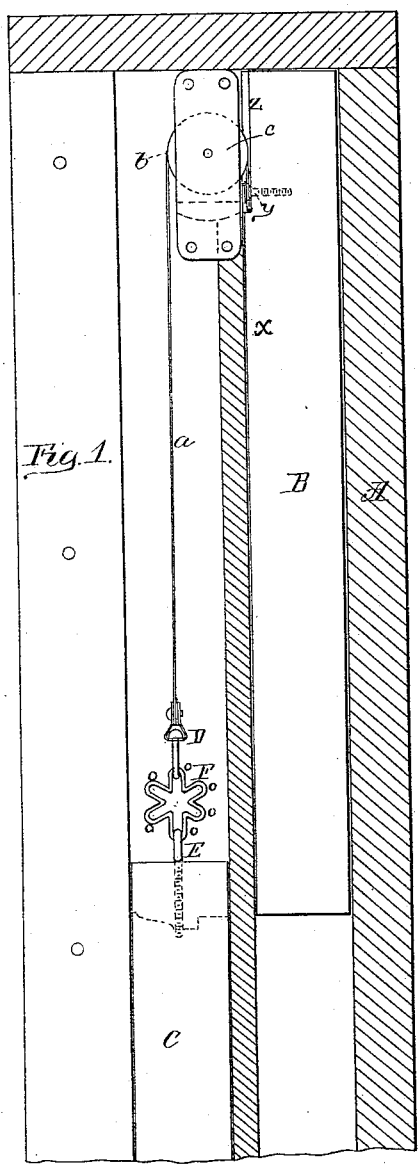
Figure 3:
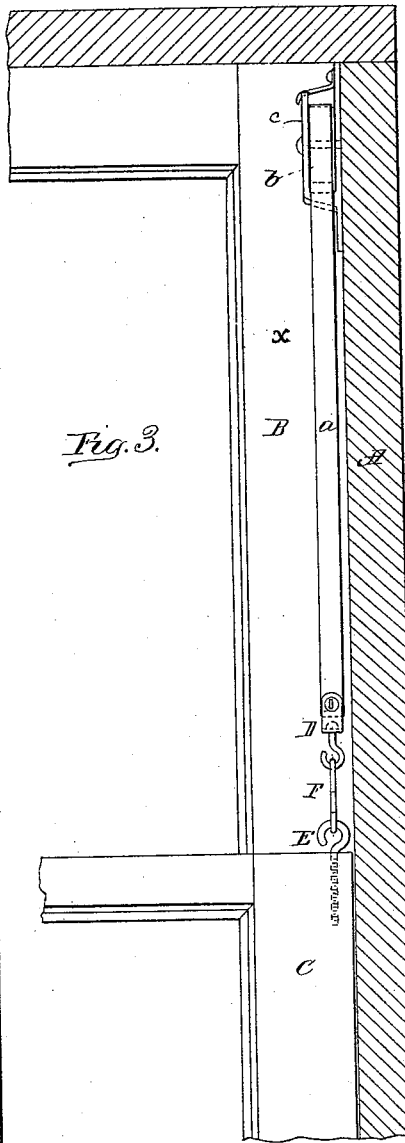
Figures 4, 5:
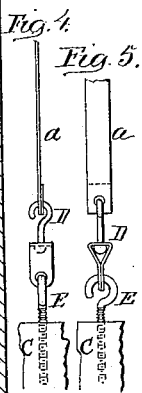
Figure 2:
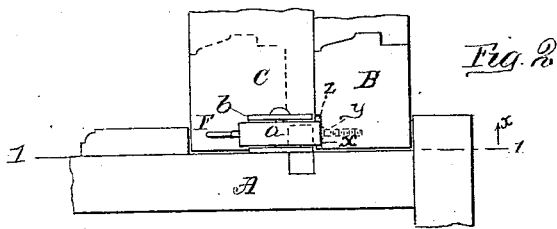
Figure 6:
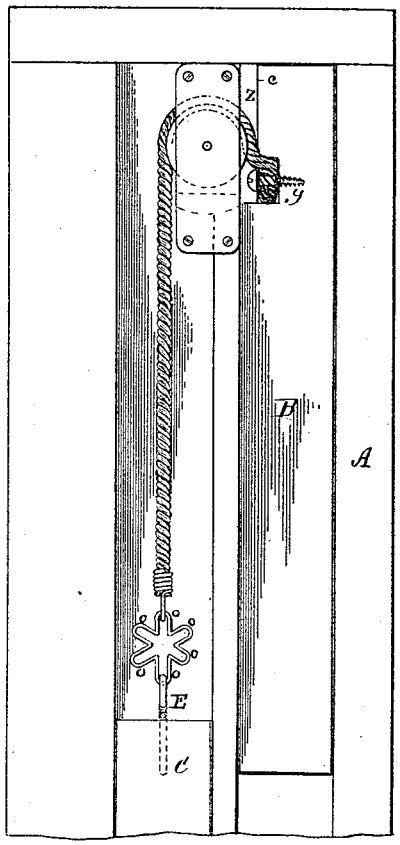
Figure 7:
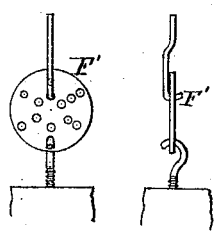
Figure 7:
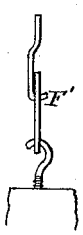
Figure 7:
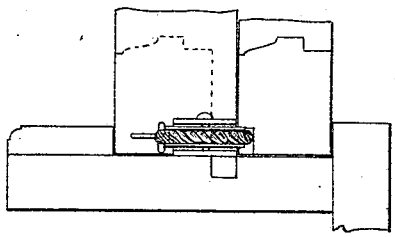

This improvement is specially intended for application to window sashes and casings that are unprovided with weights, and admits of the hanging or balancing of the sashes at a slight cost compared with what it would be to provide the casing with chambers to receive weights by tearing and cutting away the studding on each side of said casing; also, my improvement can be used to advantage in cases where the cords are broken and the weights have fallen and are resting on the bottom of the chambers of the casing, and avoids the necessity of removal of the cover to the pocket of the chamber and the consequent marring of the paint and the adjoining wood-work; or, in cases where no provision has been made for entrance to the chamber, it saves cutting into said chamber to get to the weight to rehang it.
In the drawings, Figure 1 is a vertical section of a portion of one side of a window-casing, taken on line 1 1 of Fig. 2, as seen when looking in the direction indicated by arrow $x$, the two sashes being shown in edge view. Fig. 2 is a horizontal section of one side of the window-casing, portions of the two sashes being shown in top view. Fig. 3 is a vertical section of a portion of the window-casing, taken in a plane at right angles to that of Fig. 1, and in the same plane with the front face of the lower sash. Fig. 4 is an edge view, and Fig. 5 a front view, of a portion of the band $a$ and the swivel connecting said band to the hook applied to the lower sash. Fig. 6 is a vertical section of a portion of a window-casing, showing the manner of connecting the sashes by means of a cord according to my improvement. Fig. 7 is a top view of the two sashes, showing in section one side of the window-casing. Fig. 8 is a front view, and Fig. 9 an edge view, of an adjuster sometimes used by me in place of that shown in Fig. 6.

A denotes the window-casing, B the upper sash, and C the lower sash, they being arranged in the said casing in the usual manner, $b$ representing the pulleys and $c$ the supporting-case thereof, said case being open at top and there provided with a spring $c'$, (see Fig. 3,) which on being raised admits of the band or attachment being applied to or removed from the pulley without detaching either end of said attachment from its sash. In connecting the two sashes, in place of a cord at each side of the sashes, I preferably make use of an attachment consisting of a metallic band-wire or wire cable $a$, (but one of which is shown in the drawings,) so as to avoid the shrinkage and stretching incident to a cord, and after securing one end of the said attachments to the front face of the side bars of the upper sash or in a rabbet $z$ made therein, and at a point below the axis of the pulleys $b$, as shown at $y$ in Fig. 1, each attachment is next carried over its pulley $b$ and downward and connected at its lower end to the screw-hook E or to a swivel D, attached to the said screw-hook, the latter screwed into the top of the lower sash C, as shown in Figs. 4 and 5; or said attachment has a hook which is hooked into an adjuster F, consisting of a series of radial loops $o$, each differing in length from that of the others, (see Fig. 6,) or of a plate F', provided with holes arranged on radial lines and located at different distances from the center of it. The said adjuster admits of additional adjustment to that of the screw E of the attachment a, and is for use more particularly when a cord is employed to connect the sashes, the screw E itself, when connected to a swivel applied to the attachment a or directly to the said attachment, usually affording sufficient adjustment to cause the sashes to properly close when a metallic attachment is used to connect the said sashes.

From the foregoing it will be seen that by my improvement the sashes of windows which have never been balanced or supported by weights can easily be converted into balanced or compensating sashes, and the devices can be applied to the sashes without the removal of said sashes from their casing.

Sometimes I dispense with both the swivel and the adjuster and make the screw-hook E of sufficient length to effect any necessary adjustment of the sashes and detachably connect the band wire or cable a directly to said screw-hook, as hereinbefore mentioned. In such case, to effect adjustment of the sashes, detach the attachment a from said screw-hook and revolve the latter to the necessary extent, and then again connect the attachment to the said hook.

Having described my improvement, what I claim is—

1. The combination of the sashes, the pulleys pivoted in case open at top, the spring extending across said opening, the band or attachment connecting the sashes, and the screw screwed into the top bar of the lower sash and connected to said attachment, as set forth.

2. The combination of the sashes, the pulleys pivoted in case open at top, the spring extending across said opening, the band or attachment connecting the sashes, the screw screwed into the top bar of the lower sash, and a swivel connecting said screw to the attachment, as set forth.

3. The combination, with the pulleys and sashes, of the screw applied to the top of the lower sash, the adjuster provided with a series of radial arms of unequal length adapted to connect with said screw, and the attachment having a swivel-hook to connect with the adjuster, said attachment secured at upper end to the front of the top sash and applied to the pulleys, as shown, and for the purpose explained.

4. The adjuster having a series of arms each of unequal length and arranged radially, in combination with the sash attachment secured at one end to the front of the upper sash and connected at its other end to said adjuster, the sashes, and pulleys, and the screw-hook applied to the lower sash, said hook connected to said adjuster, all as shown and set forth.

In testimony whereof I affix my signature in presence of two witnesses.

WILLIAM W. S. ORBETON.

Witnesses:
S. N. PIPER,
WM. H. PRESTON.